Feb. 10, 1970   J. C. JUREIT   3,494,645
HIGH SECTION SPLICE PLATE AND JOINT THEREWITH
Filed May 6, 1968   2 Sheets-Sheet 1

INVENTOR
JOHN C. JUREIT

BY *Le Blanc & Shur*
ATTORNEYS

Feb. 10, 1970  J. C. JUREIT  3,494,645
HIGH SECTION SPLICE PLATE AND JOINT THEREWITH
Filed May 6, 1968  2 Sheets-Sheet 2

INVENTOR
JOHN C. JUREIT
BY
LeBlanc & Shur
ATTORNEYS

United States Patent Office 3,494,645
Patented Feb. 10, 1970

3,494,645
HIGH SECTION SPLICE PLATE AND JOINT
THEREWITH
John Calvin Jureit, Coral Gables, Fla., assignor to
Automated Building Components, Inc., Miami,
Fla., a corporation of Florida
Filed May 6, 1968, Ser. No. 726,832
Int. Cl. F16l 7/00, 5/00, 9/00
U.S. Cl. 287—20.92                                        16 Claims

ABSTRACT OF THE DISCLOSURE

A plate having a plurality of nail-like teeth struck therefrom for embedment in a pair of butting wooden members to form a structural joint. The plate has an enlarged band of metal along the opposite lateral edges from which no teeth are struck and has a limited number of teeth across a given cross section whereby the moment of inertia and the overall effective net section of the plate are increased. The plate further having an increased length to width ratio so as to provide a sufficient number of teeth to carry shear loadings.

BACKGROUND OF THE INVENTION

This invention relates to metal connectors and structural wood joints, and more particularly to connectors and joints of the butt type used in prefabricated wooden structures, such as roof trusses, floor joists, and the like.

The joinder of structural load-bearing wooden members has recently and significantly been advanced with the advent of structural wooden joints which are connected solely by means of metal plates having slender, elongated nail-like teeth struck therefrom and embedded in the woden members, such as illustrated in Jureit Patent No. 2,877,520. Plates of this type, wherein the teeth thereof serve as the only means holding the plates onto the wooden members and the wooden members in adjoining relation, are usually formed of sheet metal steel having a usual thickness of 14 U.S. Standard gauge in order that the plates have the capability of withstanding heavy loads when the same are employed, for example, in prefabricated roof and floor truss assemblies.

In a roof truss, the spliced lower chord members are subject to maximum loading in tension, whereas in floor joists the maximum loading will be in flexure or bending combined with a lesser loading in tension. As roof trusses and floor joists employing connector plates of this type are employed for larger buildings and have greater spans, the loading at the spliced joints increases greatly to the point where the metal plate may fracture or tear, usually beginning at the lowermost edge of the plate where the combined flexural and tension stresses are at a maximum. The problem is thus to increase the overall effective net section of the metal plate such that it can be employed in joints subject to significantly higher loadings in both tension and flexure within the constraints imposed by the design and loading characteristics of roof trusses and floor joists and the necessity to provide an economical plate.

To increase the loading that the plate can withstand, a heavier gauge metal can be employed in forming the plates whereby the overall effective net section of the plate would be increased. This, however, results in a more costly plate. An increase in the width of the plate to provide additional metal across the net section thereof and thereby increase the quantity of metal available across the plate to withstand tensile loading has also been proposed. However, there is a practical limit to the width of the plate, such limit being determined, in part, by the width of the wooden members which the plate joins, that is, the width of the plate ought not exceed the width of the wooden members to which it is applied. In practice, a clearance is left between the edges of the plate and wooden member as the resistance to withdrawal and shear resistance at the edge portions of the wooden member are significantly reduced as compared with the central portions of the wooden member. This practical limit is, in the case of a 2 x 4 board, about 3 inches. To my knowledge, the problem of increasing the strength of connector plates to withstand these increased loadings by increasing the overall effective net section without recourse to a heavier gauge metal or increasing the width of the plate has been heretofore unsolved.

SUMMARY OF THE PRESENT INVENTION

According to the present invention, it has been found that an increase in the overall effective net section of a given connector plate of the type having a plurality of teeth struck therefrom to extend at right angles thereto for embedment in and thereby joining two wooden structural members can be obtained by providing a limited number of teeth struck from the plate at a given cross section or, in other words, reducing the number of teeth at a given cross section as compared with prior connector plates of this type. This can be accomplished without concomitant loss of the ability of the teeth to withstand shear stresses at their base by providing an elongated plate with additional teeth in the longitudinal rows thereof as set forth below. In this manner, an increase in the ability of the plate to withstand combined tension and flexure loadings is effected. The teeth are also arranged in the plate in patterns to optimize the moment of inertia of the plate, thereby increasing its strength in flexure.

Tension and flexural stresses are functions of the moment of inertia and overall effective net section of the plate. An optimal increase in the moment of inertia of the plate and an increase in the overall effective net section thereof, in combination with a minimum reduction of teeth across a given plate as compared with prior art plates of this type, is afforded by providing a band of metal along the lateral edges of such plate of at least a width equal to the smallest distance between the centerlines of adjacent rows of teeth or, in other words, striking only inner rows of teeth leaving large widths or bands of metal near the plate edges unpunched. In this manner, the overall effective net section and the moment of inertia of the plate are both increased with additional metal being provided in the areas of the plate, i.e., the lateral edges, which undergo the maximum loading. Note that this is accomplished without employing a heavier gauge metal or increasing the width of the plate. The moment of inertia of the plate hereof may be further increased by providing enlarged bands or widths of metal between next adjacent inner rows of teeth. This, of course, also further increases the overall effective net section of the plate. These intermediate bands of metal are arranged generally symmetrical about the neutral axis or centerline of the plate whereby the plate may be applied without regard to its particular orientation relative to the joined members.

To provide against failure in shear, caused by the provision of the enlarged widths or bands of metal (where otherwise a tooth would be punched as in prior art plates), the present connector plate is elongated as compared with prior art plates. The greater length provides additional plate area from which additional teeth are punched, whereby the number of teeth across the plate at any given cross section remains limited. A net gain in overall net section and moment of inertia is thus accomplished without decreasing the strength of the plate in shear.

Accordingly, it is a primary object of the present invention to provide improved structural load-bearing wooden joints and connectors therefor wherein the connectors are of the type having a plurality of nail-like teeth struck therefrom and are capable of withstanding high loadings in both tension and flexure.

It is another object of the present invention to provide improved structural load-bearing wooden joints and connectors therefor wherein the connectors are particularly formed to withstand higher loadings than connector plates heretofore available.

It is still another object of the present invention to provide improved connectors for joining the members of conventional load-bearing wooden joints wherein the connectors are of the type having a plurality of nail-like teeth struck therefrom and have a high overall effective net section afforded by a unique disposition of the teeth in the plate, whereby the moment of inertia of the plate is optimally increased without reduction of the shear resisting properties of the plate.

It is a further object of the present invention to provide improved connectors for joining the members of structural load-bearing wooden joints of the type having a plurality of nail-like teeth struck therefrom wherein the teeth are spaced inwardly of the plate edges to provide relatively large widths or bands of metal along the outer edges of the connector plate as compared to the smaller bands of metal between adjacent rows of teeth whereby initial tearing of the plate is effectively resisted.

It is still a further object of the present invention to provide an improved connector plate for joining the members of structural load-bearing wooden joints of the type having a plurality of nail-like teeth struck therefrom leaving a plurality of slots in the plate wherein the plate has a reduced slot-to-metal area ratio at a unit cross section and a reduced tooth density as compared with prior connector plates, thereby increasing the capability of the plate to withstand high loadings.

It is still a further object of the present invention to provide an improved connector plate for structural load-bearing wooden joints having the foregoing characteristics wherein the plate is low in cost and is readily and easily fabricated.

These and further objects and advantages of the present invention will become more apparent upon reference to the following specification and claims and the appended drawings.

DESCRIPTION OF THE DRAWING FIGURES

Figure 6:
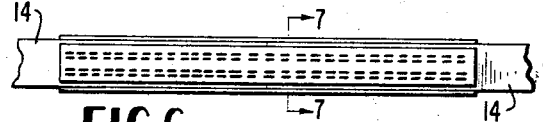
Figure 7:
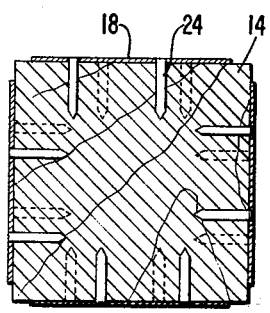

FIGURES 5a–h are fragmentary plan views of the different forms of connector plates hereof illustrating the various tooth patterns thereof;

FIGURE 6 is a fragmentary side elevational view on a reduced scale of a wooden joint employing the connector plates hereof on each planar side of the joint; and FIGURE 7 is an end sectional view of the wooden joint illustrated in FIGURE 6 and taken about on line 7—7 thereof.

DESCRIPTION OF A PREFERRED EMBODIMENT

Figure 1:
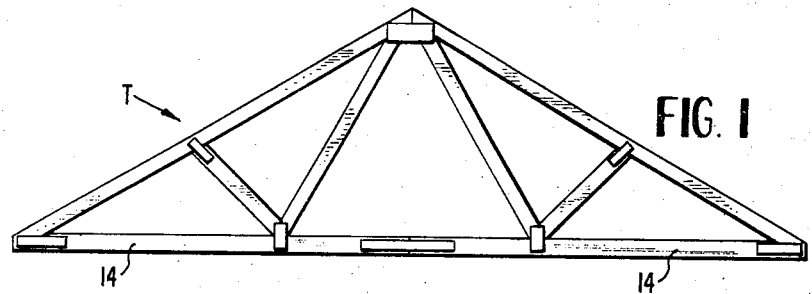
FIGURE 1 is an elevational view of a truss employing connector plates of the type having a plurality of teeth struck therefrom for joining the members of the truss.
Figure 2:
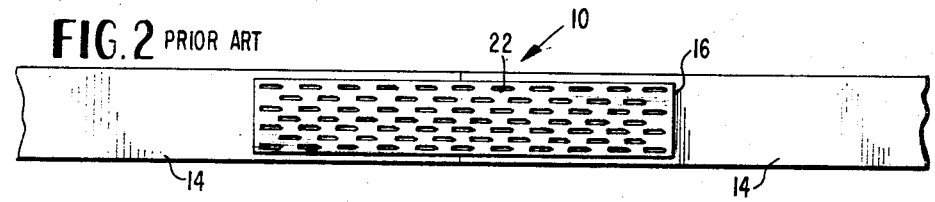
FIGURE 2 is a fragmentary side elevational view of a wooden joint, for example, the lower chord splice of the truss shown in FIGURE 1, employing a connector plate of the prior art type.
Figure 3:
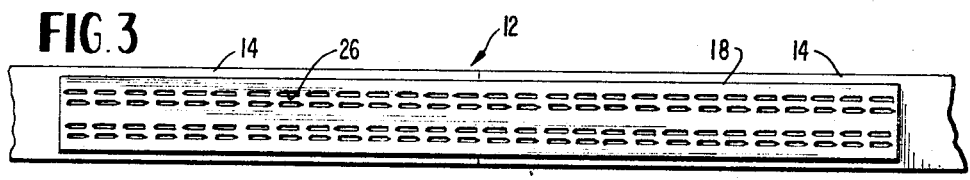
FIGURE 3 is a fragmentary side elevational view of a wooden joint, for example, the lower chord splice of the truss shown in FIGURE 1, employing a connector plate constructed in accordance with the present invention.
Figure 4:
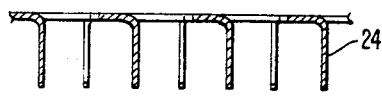
FIGURE 4 is a fragmentary longitudinal cross sectional view of a connector plate hereof on an enlarged scale.

Referring to the drawings, particularly FIGURE 1, there is shown a truss T, for example, a roof truss, having the upper and lower chords thereof joined one to the other by connector plates of the type hereinbefore discussed and disclosed in the aforementioned patent. In FIGURES 2 and 3, there is shown a pair of structural butt joints, generally indicated at 10 and 12, each of which may comprise, for example, the lower chord splice joint of the truss T of FIGURE 1. Each joint includes a pair of structural wooden load-bearing members 14 joined together by connector plates, the prior art plate being illustrated in FIGURE 2 at 16 and a plate constructed in accordance with the present invention being illustrated in FIGURE 3 at 18. The prior art connector plate 16 may be of the type disclosed, for example, in the above-identified patent and comprising a sheet metal plate having a plurality of nail-like teeth struck to extend at right angles therefrom leaving a plurality of longitudinally extending slots 22 formed in the plate. The teeth are embedded in the adjoining wooden members 14 by the application of pressure against the outer face of plate 16 as by a suitable press to form a structural load-bearing joint. Plates of this type have been found eminently satisfactory and suitable as load-bearing connectors as evidenced by their widespread use and acceptance particularly throughout the wooden building construction industry.

The connector plate 18 formed in accordance with the present invention to carry higher loadings in both tension and flexure as compared with the foregoing prior plate comprises a sheet metal plate, preferably formed of 14 U.S. Standard gauge sheet metal plate, having a plurality of longitudinal rows of slender, elongated nail-like teeth 24 struck therefrom leaving longitudinally extending rows of elongated slots 26. To form a structural load-bearing joint employing the present plate, the teeth thereof are embedded in the wooden members 14 in any suitable manner similarly as the prior art connector plate. While only a single plate is illustrated in both FIGURES 2 and 3, it will be understood that at least two plates are normally employed to form each joint, with one plate on each side of the wooden members and the teeth in the opposed plates extending towards one another within the wooden members. The teeth 24 in each longitudinal row of plate 18 are struck in the same direction so that the slots 26 left thereby extend from the teeth in the same direction while the teeth 24 in the next transversely adjacent rows are struck in opposite directions such that the slots 26 in adjacent longitudinal rows extend from the teeth in opposite directions. It will be understood that teeth 24 may be V-shaped in cross section to reinforce the same along their longitudinal axes and that the tips thereof terminate in pointed ends 28 which may be chisel-pointed tips or scarfe-pointed tips or combinations of these two types of tips, all of which is conventional construction and therefore not specifically illustrated.

It will be noted that the conventional prior art connector plate 16 has a uniform distribution of the teeth and slots along opposite sides of the longitudinal centerline of the plate and that the slots left by the struck teeth are transversely equally spaced one from the other outwardly from the centerline with the outermost row of slots being spaced from the lateral edges of the plate 16 one-half the distance between adjacent rows of the innermost slots. While this plate can carry substantial loadings both in tension and flexure, it will be seen that the effective net section of plate 16 as compared, for example, with an unpunched plate, is diminished by the sum of the areas of these slots at a given cross section and that such diminution or reduction is uniform across the plate. The combined effective tensile and flexural loading which plates of this type can carry is primarily determined by the overall effective net section along a given cross section of the plate, the moment of inertia of the plate, and the maximum shear load which the shank or base portions of the teeth can withstand, the effective net section of the plate being related to the plate moment of inertia. It will be seen that the overall effective net section of the prior are plate 16 illustrated in FIGURE 2 and the moment of inertia thereof about its neutral axis is reduced by the area of the slots 22 which would otherwise contain metal, the center of gravity of the metal on opposite sides of the neutral axis lying substantially halfway between the neutral axis and the outer edges of the plate. This reduction in moment of inertia and effective net section in order to provide teeth struck from the plate increases the unit stress applied to the plate for a given loading and accordingly reduces the magnitude of the loading at which the plate will fracture or tear.

In accordance with the present invention, it has been found that the overall effective net section and moment of inertia of a connector plate of this type can be increased to a large extent without reducing the maximum shear load which the shank or base portions of the teeth can withstand. This decreases the unit stress applied to the plate for a given loading and increases the maximum loading which the present plate can carry as compared with previous plates of the type shown in FIGURE 2. The foregoing is accomplished principally by striking teeth only from inner portions of the plate, leaving at least a pair of longitudinally extending transversely enlarged continuous bands or widths of metal along opposite edge portions of the plate and providing an elongated plate having a large number of teeth in each longitudinal row thereof.

It has been found that a combined optimal increase in the overall effective net section and the moment of inertia of the plate can be accomplished by providing the enlarged metal bands or increased metal width portions along the opposite lateral edge portions of the plate. The large quantity of metal along these edge portions provides an increase in the overall effective net section of the plate while providing increased metal at the edge portions thereof which are subject to the maximum stress, that is, maximum combined tension and flexural stresses. The center of mass or gravity of the plate portions on opposite sides of the neutral axis of the present plate is located outwardly of the neutral axis of the plate a distance further than the center of mass or gravity of a plate having teeth spaced uniformly across the entire width of the plate similarly as the prior plate of FIGURE 2. This increase in distance causes an increase in the plate moment of inertia by a factor equal to the square of the increase in distance multiplied by the additional mass of metal of such plate portions. Accordingly, the effective net section and moment of inertia of the present plate are optimized by forming the plate such that the distance between the edge of the plate and the centerline of the outermost row of teeth on opposite sides of the plate is a least twice the distance between the centerlines of the closest pair of adjacent rows of slots. Preferably, the outermost edges of the outermost rows of slots are respectively spaced from the edges of the plate a distance at least equal to 1.8 times the distance between the closest edges of the slots in the closest pair of adjacent rows in the plate. The moment of inertia and overall effective net section of the plate is accordingly optimally increased whereby the unit stress on the plate for a given load is decreased.

Figure 5A:
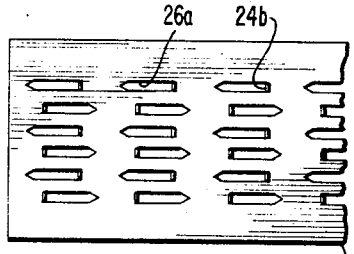
Figure 5B:
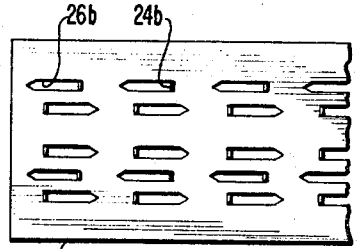

A plate constructed in accordance with the foregoing is illustrated in FIGURE 5a wherein the slots 26 left in the plate are equally transversely spaced one from the other with the distance between the outer edges of the plate and the centerlines of the outermost rows being twice the distance between the centerlines of adjacent rows. This represents a significant increase in the overall effective net section and the moment of inertia of the plate as compared with prior art plates as set forth below. As illustrated in FIGURES 3 and 5b–h, the moment of inertia and overall effective net section of the present plate can be further increased by providing longitudinally extending enlarged widths or bands of metal intermediate the outermost rows of slots as by increasing the transverse spacing between the slots or elimination of one or more of the longitudinally extending rows of teeth. The enlarged bands of metal are preferably provided such that the teeth are symmetrically patterned about the centerline of the plate. This precludes asymmetrical loading of the plate, as well as limiting plate use on the physical orientation of the plate relative to the members forming the wooden joint. For example, in the 3 inch nominal width plates illustrated in FIGURES 3 and 5b, the overall effective net section and moment of inertia of each plate are increased by providing a continuous laterally enlarged, longitudinally extending band of metal along opposite lateral edge portions of the plate which is substantially wider than the width of the longitudinally extending metal strips between adjacent slots, together with an additional laterally enlarged longitudinally extending band of metal provided in the central portion of the plate. The plate illustrated in FIGURE 3 has two rows of teeth on opposite sides of a laterally enlarged central band of metal which has a width about 4 times the width of metal between the closest edges of the paired rows of slots. In FIGURE 5b, a continuous laterally enlarged band of metal is provided in a slightly offset central portion of the plate with two rows of teeth lying on one side and three rows of teeth on the other side of the longitudinal centerline. In the latter instance, the width of the band of metal is about 2½ times the width of the metal between the closest edges of adjacent rows of slots and an additional row of teeth is formed in the plate of this embodiment as compared with the plate illustrated in FIGURE 3. The plates illustrated in FIGURES 3 and 5a are symmetrical with respect to their centerline or neutral axes, while the plate illustrated in FIGURE 5b is somewhat asymmetrical.

Figure 5C:
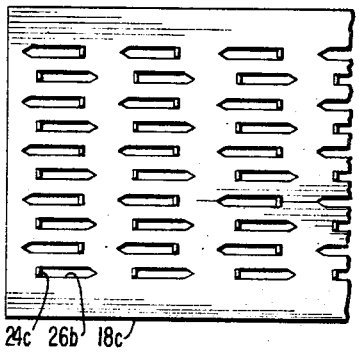
Figure 5F:
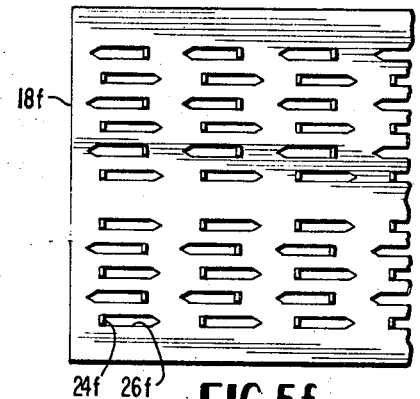
Figure 5D:
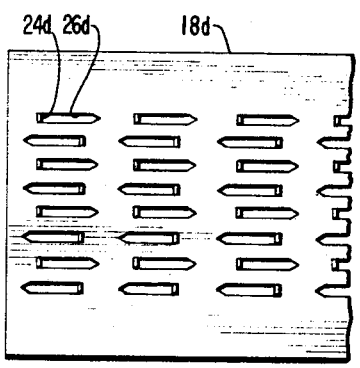
Figure 5G:
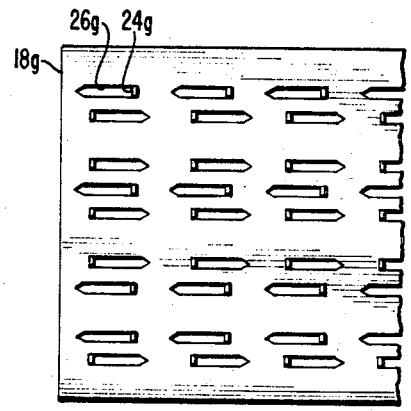
Figure 5E:
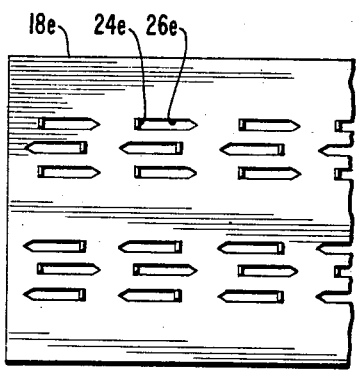

The 4 inch nominal width plates illustrated in FIGURES 5c–e each have the continuous longitudinally extending laterally enlarged metal band extending along opposite lateral edge portions of the plates with the width of the band being substantially larger than and at least about 1.8 times the width of the metal between closest adjacent rows of interior slots. The plate illustrated in FIGURE 5c has a similar tooth pattern as the plate shown in FIGURE 5a but is nominally one inch greater in width for use with larger width joint members. Accordingly, this plate has a corresponding additional number of rows of teeth struck therefrom. In FIGURES 5d and 5e, the laterally enlarged bands of metal along opposite edge portions of these plates are even further enlarged to about four times the width of the band of metal between the closest edges of adjacent rows of slots. The plate shown in FIGURE 5e has a central longitudinally extending laterally enlarged band of metal having a width approximately equal to the width of the laterally enlarged bands of metal. These plates are each symmetrically arranged with respect to the neutral axis or longitudinal centerline.

Figure 5H:
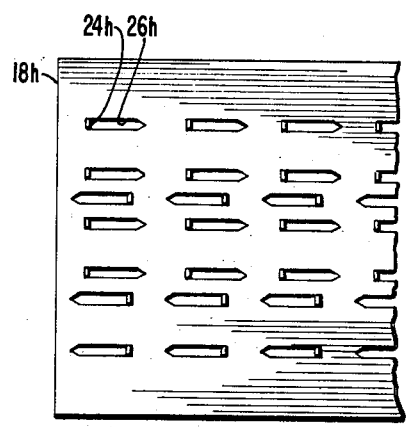

The five inch nominal width plates illustrated in FIGURES 5f–h have continuous longitudinally extending laterally enlarged bands of metal along their lateral edge portions similarly as in the previous embodiments. The plate shown in FIGURE 5f has an additional laterally enlarged band of metal in the central portion of the plate slightly offset from the plate centerline, the central band having a width equal to the width between the closest edges of alternate rows of slots or about 2½ times the width between the closest edges of adjacent rows of slots. In the plate illustrated in FIGURE 5g, three interior longitudinally extending laterally enlarged bands of metal are provided in addition to the bands provided along the edge portions of the plate and have widths equal to the widths between the closest edges of alternate equally spaced rows of slots or about 2½ times the width between the closest edges of adjacent rows of slots. The laterally enlarged bands are arranged such that two rows of teeth lie between each band and three rows lie between the second and third bands looking from the top of the plate to the bottom in FIGURE 5g. The plate illustrated in FIGURE 5h has, in addition to the laterally enlarged bands of metal along its lateral edge portions, three laterally enlarged bands of metal extending longitudinally of the plate intermediate the outermost rows of teeth thereof. The width of each band is equal to the width between the closest edges of alternate rows of slots or about 2½ times the width between the closest edges of the next adjacent rows of slots. Looking from top to bottom in FIGURE 5h, a single row of teeth separates the first lateral band from the second band, three rows of teeth separate the second from the third band, two rows of teeth separate the third from the fourth band, and a single row separates the fourth from the opposite lateral edge band. The plates illustrated in FIGURES 5f–h are slightly asymmetrical with respect to the neutral axis and the center of gravity of the plate is slightly laterally offset from the geometrical centerline of the plate.

To provide a sufficient number of teeth in the plate to preclude shearing thereof under high loadings, the plates of the present invention are elongated such that a large number of teeth per longitudinal row can be provided as compared with the prior art plates hereinbefore discussed. For example, it has been found that a 25% increase in the length of the present plate over an optimally designed prior art plate having uniformly distributed teeth provides sufficient additional plate length from which additional teeth can be struck to afford a sufficient number of nails to preclude shear stresses in shank portions of the teeth which otherwise might shear the teeth at loadings below the maximum designed loading of the plate. It has been found that a plate having a length to width ratio of at least 4 and provided with teeth uniformly spaced one from the other in each longitudinally extending row thereof for substantially the full length of the plate provides a plate having a sufficient number of teeth to preclude shearing thereof under high loadings, particularly in view of the small number of teeth in rows across the plate.

In the preferred embodiments of the various plates, the centerlines of adjacent rows of slots are .372 inch, one from the other, the teeth are .812 inch long, and the slot widths are .125 inch providing .247 inch between the closest edges of the next adjacent rows of slots. The foregoing dimensions including the width of the metal bands relative to the widths of metal between adjacent rows of teeth are maintained for each plate. The teeth patterns of the present plates are arranged to provide a low tooth density and a low ratio of the cross-sectional area of the slot to the cross-sectional area of the metal across the plate adjacent the slots hereinafter referred to as slot-plate ratio, as compared to prior art plates of this type. The latter plates normally have a tooth density of greater than two teeth per square inch and a slot plate ratio of about .5. It will be seen from the following table that the plates of the present invention have tooth densities lying within a range from about 1.75 to 1.00 teeth per square inch. Additionally, the slot-plate ratio of the plate of the present invention lies within a range from about .4 to .2. Both of these factors are significant in arranging the tooth pattern moment of inertia, and overall net section of the plates.

The characteristics of a preferred embodiment of each of the plates illustrated in FIGURES 3 and 5a–h are respectively listed in the following table, wherein column I discloses the actual dimensions of the plates in inches; column II represents the ratio of the unit area of the slots to the unit area of the metal across the plate adjacent the slots; column III represents the tooth density in number of nails per square inch; and column IV represents the actual length to width ratio: all the plates being formed of 14 U.S. standard gauge galvanized sheet metal having tooth widths of .125 inch, and a distance between centerlines of next adjacent rows of slots of .372 inch.

TABLE

| Column I | Column II | Column III | Column IV |
| --- | --- | --- | --- |
| 2.980 × 36.75 | .202 | 1.02 | 11.30 |
| 2.980 × 22.3125 | .336 | 1.53 | 7.40 |
| 2.980 × 28.875 | .266 | 1.27 | 9.65 |
| 4.472 × 19.6875 | .387 | 1.71 | 4.39 |
| 4.472 × 26.2500 | .296 | 1.35 | 5.90 |
| 4.472 × 36.7500 | .202 | 1.02 | 8.21 |
| 5.215 × 22.3125 | .356 | 1.61 | 4.28 |
| 5.216 × 27.5625 | .269 | 1.33 | 5.28 |
| 5.216 × 36.750 | .202 | 1.03 | 7.05 |

On comparing the plates hereof with corresponding plates of the prior art as illustrated in FIGURE 2, the latter having like widths and uniformly distributed slots throughout the plate of like spacing as the present plates and without the provision of the enlarged bands or widths of metal provided herein, it is found that the ratio of the slot-to-metal area of the present plates on the average is decreased by about 33%, thus affording significant increases in the overall effective net section. An average increase in the moment of inertia of the present plates on the order of 10% as compared to the prior art plates has also been effected.

Referring now to FIGURES 6 and 7, there is shown a pair of butting wooden members 14 which may comprise the lower chord members of the truss shown in FIGURE 1 at the splice joint thereof, the members 14 being joined one to the other to form a structural load bearing joint by connector plates 18 of the present invention applied to each of the coplanar surfaces of members 14. In this instance, the members 14 have four planar sides and accordingly four plates 18 are employed. The plates are pressed into the butting members 14 by a suitable press, not shown, and it will be seen that the outermost rows of teeth of each plate do not in any way interfere with the outermost rows of teeth of the plates pressed into the adjoining sides. By providing the enlarged widths or bands of metal along the outer plate edges, the outermost rows of teeth are spaced inwardly from the plate edges and, when applied to the wooden members, are spaced inwardly from the adjacent planar side at least a full tooth length. Thus, the plates hereof have the additional advantage, apart from the higher strength characteristics in tension and flexure, that the teeth of each plate do not engage the teeth of an adjacent plate as either are pressed into an adjoining planar side which otherwise might bend or distort the plate being pressed into the members and/or the engaged teeth of either or both plates.

It will thus be seen that the objects of the invention are fully accomplished in that there are provided connector plates of the type having teeth struck therefrom for embedment into wooden butting members to form structural joints wherein the plates are characterized by increased strength in both tension and flexure, particularly at the outer edge portions of the plate which are the areas most likely to initially fracture or tear. This has been accomplished by providing a limited number of teeth across any given cross section, by forming enlarged widths or bands of metal along the lateral edge portions of the plate, as well as in the central portions of the plate when desirable, and providing an elongated plate from which additional teeth can be struck to provide sufficient strength in shear.

The invention may be embodied in other specific forms without departing from the spirit or essential characteristics thereof. The present embodiments are therefore to be considered in all respects as illustrative and not restrictive.

What is claimed and desired to be secured by United States Letters Patent is:

1. A connector comprising a sheet metal plate having a plurality of slender, elongated nail-like teeth struck from the surface of said plate to leave a plurality of spaced elongated slots lying generally in transversely spaced, longitudinally extending, substantially parallel rows, the transverse spacing between the lateral edges of the plate and the outer edges of the slots forming the outermost row of slots along each side of said plate being at least 1.5 times the spacing between the juxtaposed edges of the slots forming the closest spaced next adjacent rows of slots, said spacing obtaining substantially uniformity throughout the full length of the plate, the lateral spacing of the rows of teeth and the arrangement of the teeth and the slots in the plate being such that the center of gravity of each plate portion lying on opposite sides of the longitudinal centerline of the plate lies laterally outwardly of a straight line in the plate extending parallel to said plate centerline and medially of said plate portion, said plate having a length to width ratio of at least 4 to 1 with the teeth in each longitudinally extending row being uniformly spaced one from the other substantially throughout the full length of the plate.

2. A connector according to claim 1 wherein the transverse spacing between the closest edges of the slots forming a pair of adjacent rows of slots is at least twice the spacing between the closest edges of the slots forming a second pair of next adjacent rows of slots.

3. A connector according to claim 2 wherein the spacing between the closest edges of the slots forming each pair of the remaining adjacent rows of slots is substantially equal and equal to the spacing between said slot edges of said second pair of rows of slots.

4. A connector according to claim 1 wherein the transverse spacing between the closest edges of the slots forming a pair of adjacent rows of slots is about 4 times the spacing between the closest edges of the slots forming each pair of the remaining next adjacent rows of slots, the spacing between the closest edges of the slots forming each pair of the remaining adjacent rows of slots being substantially equal.

5. A connector according to claim 1 wherein the transverse spacing between the lateral edges of the plate and the outer edges of the slots forming the outermost rows of slots is about twice the spacing between the juxtaposed edges of the slots forming the closest spaced next adjacent rows of slots.

6. A connector according to claim 5 wherein the distances between the closest edges of the slots forming each adjacent pair of rows of slots are substantially equal.

7. A connector according to claim 1 wherein the transverse spacing between the closest edges of the slots forming each of two pair of adjacent rows of slots is at least twice the spacing between the closest edges of the slots forming the pair of the closest spaced next adjacent rows of slots.

8. A connector according to claim 1 wherein the ratio of the combined cross sectional areas of the slots to the cross sectional areas of the metal plate portions adjacent the slots at like longitudinal positions along said plate is no greater than .4 and the density of the teeth in the plate is less than 1.75 teeth per square inch.

9. A structural load bearing joint comprising a pair of butting wooden members, a pair of connector plates engaging opposite sides of the wooden members and spanning the butting interface thereof, each of said plates having a plurality of slender, elongated nail-like teeth struck from the surface thereof for embedment into said wooden members, said teeth leaving a plurality of spaced elongated slots lying generally in transversely spaced, longitudinally extending, substantially parallel rows, the transverse spacing between the lateral edges of the plate and the outer edges of the slots forming the outermost row of slots along each side of said plate being at least 1.5 times the spacing between the juxtaposed edges of the slots forming the closest spaced next adjacent rows of slots, said spacing obtaining substantially uniformly throughout the full length of the plate, the lateral spacing of the rows of teeth and the arrangement of the teeth and slots in the plate being such that the center of gravity of each plate portion lying on opposite sides of the longitudinal centerline of the plate lies laterally to said plate centerline and medially of said plate portion, the ratio of the combined cross-sectional areas of the slots to the cross sectional areas of the metal plate portions adjacent the slots at like longitudinal positions along said plate being no greater than .4 and the density of the teeth in the plate being less than 1.75 teeth per square inch, each of said plates having a length to width ratio of at least 4 to 1 with the teeth in each longitudinally extending row being uniformly spaced one from the other substantially throughout the full length of the plates.

10. The joint according to claim 9 wherein the transverse spacing between the closest edges of the slots forming a pair of adjacent rows of slots in each plate is at least twice the spacing between the closest edges of the slots forming a second pair of next adjacent rows of slots.

11. The joint according to claim 9 wherein the transverse spacing between the lateral edges of each plate and the outer edges of the slots forming the outermost rows of slots is about twice the spacing between the juxtaposed edges of the slots forming the closest spaced next adjacent rows of slots.

12. A structural load bearing joint comprising a pair of wooden members having four planar sides lying substantially at right angles to each other, said members butting one another with the sides of the respective members lying in coplanar relation one to the other, at least three connector plates engaging at least three sides of the wooden members and spanning the butting interface thereof, each of said plates having a plurality of slender, elongated nail-like teeth struck from the surface of said plate for embodiment into said wooden members, said teeth having a plurality of spaced elongated slots lying generally in transversely spaced, longitudinally extending, substantially parallel rows, the transverse spacing between the lateral edges of the plate and the outer edges of the slots forming the outermost rows of slots along each side of said plate being at least 1.5 times the spacing between the juxtaposed edges of the slots forming the closest spaced next adjacent rows of slots, said spacing obtaining substantially uniformly throughout the full length of the plate, the width of each of said plates being such that the lateral edges thereof lie distances from the adjacent sides of the wooden members less than the length of the teeth formed on the next adjacent plates, the outermost rows of teeth of each plate lying distances from said adjacent sides greater than the length of the teeth formed in the plates embedded into said adjacent sides whereby the teeth of the various plates do not interfere each with the other, the lateral spacing of the rows of teeth and the arrangement of the teeth and slots in each plate being such that the center of gravity of each plate portion lying on opposite sides of the longitudinal centerline of the plate lies laterally outwardly of a straight line in the plate extending parallel to said plate centerline and medially of said plate portion, each of said plates having a length to width ratio of at least 4 to 1 with the teeth in each longitudinally extending row being uniformly spaced one from the other substantially throughout the full length of the plates.

13. The joint according to claim 12 including a fourth connector plate engaging the fourth side of the wooden members and spanning the butting interface thereof, said fourth connector plate having a plurality of slender, elongated nail-like teeth struck from the surface of said plate for embedment into said wooden members, said teeth having a plurality of spaced elongated slots lying generally in transversely spaced, longitudinally extending, substantially parallel rows, the transverse spacing between the lateral edges of said plate and the outer edges of the slots forming the outermost row of slots along each side of said plate being at least 1.5 times the spacing between the juxtaposed edges of the slots forming the closest spaced next adjacent rows of slots, said spacing obtaining substantially uniformly throughout the full length of the plate, the width of said fourth plate being such that the lateral edges thereof lie distances from the adjacent sides of the wooden members less than the length of the teeth formed on the next adjacent plates, the teeth forming the outermost rows on said fourth plate lying distances from said adjacent sides greater than the length of the teeth formed in the plates embedded into said adjacent sides whereby the teeth of said fourth plate do not interfere with the teeth of the plates embedded into said adjacent sides, the lateral spacing between the rows of teeth and the arrangement of the teeth and slots in said fourth plate being such that the center of gravity of said plate portion lying on opposite sides of the centerline of said plate lies laterally outwardly of a straight line in the plate extending parallel to said plate centerline and medially of said plate portion.

14. The joint according to claim 12 wherein the ratio of the cross-sectional area of the slots of the cross-sectional area of the plate being no greater than .4 and the density of the teeth in the plate being less than 1.75 teeth per square inch.

15. The joint according to claim 12 wherein the transverse spacing between the closest edges of the slots forming a pair of adjacent rows of slots in each plate is at least twice the spacing between the closest edges of the slots forming a second pair of next adjacent rows of slots.

16. The joint according to claim 12 wherein the transverse spacing between the lateral edges of each plate and the outer edges of the slots forming the outermost rows of slots is about twice the spacing between the juxtaposed edges of the slots forming the closest spaced next adjacent rows of slots.

References Cited

UNITED STATES PATENTS

| | | | |
|---|---|---|---|
| 3,016,586 | 1/1962 | Atkins | 85—13 X |
| 3,090,088 | 5/1963 | Foley et al. | 85—13 X |
| 3,212,389 | 10/1965 | Sandford | 85—13 |
| 3,362,277 | 1/1968 | Moehlenpah et al. | 85—13 |

RAMON S. BRITTS, Primary Examiner

U.S. Cl. X.R.

85—13

UNITED STATES PATENT OFFICE
CERTIFICATE OF CORRECTION

Patent No. 3,494,645     Dated February 10, 1970

Inventor(s) JOHN C. JUREIT

It is certified that error appears in the above-identified patent and that said Letters Patent are hereby corrected as shown below:

Column 2, line 67, "The" should read -- This --. Column 5, line 7, "are" should read -- art --. Column 10, line 7, after "laterally" insert -- outwardly of a straight line in the plate extending parallel --

SIGNED AND
SEALED
AUG 25 1970

(SEAL)
Attest:

Edward M. Fletcher, Jr.
Attesting Officer

WILLIAM E. SCHUYLER, JR.
Commissioner of Patents